(12) United States Patent
Chen et al.

(10) Patent No.: US 12,191,685 B2
(45) Date of Patent: Jan. 7, 2025

(54) POWER SYSTEM CONFIGURATIONS FOR WIRELESS CHARGING

(71) Applicant: Apple Inc., Cupertino, CA (US)

(72) Inventors: Weiyun Chen, Cupertino, CA (US); Di Zhao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 587 days.

(21) Appl. No.: 17/447,488

(22) Filed: Sep. 13, 2021

(65) Prior Publication Data

US 2023/0006450 A1 Jan. 5, 2023

Related U.S. Application Data

(60) Provisional application No. 63/216,807, filed on Jun. 30, 2021.

(51) Int. Cl.
*H02J 7/00* (2006.01)
*H02J 50/10* (2016.01)
*H02J 50/12* (2016.01)
*H02M 3/158* (2006.01)

(52) U.S. Cl.
CPC .......... *H02J 7/0024* (2013.01); *H02J 7/0014* (2013.01); *H02J 7/0019* (2013.01); *H02J 50/10* (2016.02); *H02J 50/12* (2016.02); *H02J 2207/20* (2020.01); *H02M 3/1582* (2013.01)

(58) Field of Classification Search
CPC ...... H02J 7/0014; H02J 7/0019; H02J 7/0024; H02J 2207/20; H02J 50/10; H02J 50/12; H02M 3/1582
USPC ................. 320/108, 117, 140, 158, 163, 166
See application file for complete search history.

(56) References Cited

U.S. PATENT DOCUMENTS

| 9,876,363 B2 * | 1/2018 | Lee ......................... H02J 50/10 |
| 10,498,148 B2 * | 12/2019 | Mergener ............... H02J 7/0024 |
| 2019/0341796 A1 * | 11/2019 | Gu .......................... H02J 7/0045 |

* cited by examiner

*Primary Examiner* — Edward Tso
*Assistant Examiner* — Aaron Piggush
(74) *Attorney, Agent, or Firm* — FLETCHER YODER PC

(57) ABSTRACT

A battery powered electronic device can include a wireless power system configured to receive power from a wireless power transmitter, a converter coupled to the wireless power system that converts a voltage from the wireless power system to a battery charging voltage, a battery comprising at least two cells, a power management unit that delivers power from one or more of the at least two cells to one or more subsystems of the electronic device, and a plurality of switching devices connecting the at least two cells, the converter, and the power management unit. The plurality of switching devices can be arranged so that a first switching configuration connects the cells in series for charging from the converter and a second switching configuration connects the cells in parallel for delivering power to the power management unit.

14 Claims, 8 Drawing Sheets

- VOLTAGE CONVERSION RATIO: Vout/Vin = D
- Cfly VOLTAGE: Vc = Vin/2
- Q1~Q4 VOLTAGE STRESS Vin/2
- L RIPPLE FREQUENCY: 2*fsw

POWER SYSTEM CONFIGURATIONS FOR WIRELESS CHARGING

CROSS-REFERENCE TO RELATED APPLICATIONS

This application claims the benefit of U.S. Provisional Application No. 63/216,807, filed Jun. 30, 2021, entitled "POWER SYSTEM CONFIGURATIONS FOR WIRELESS CHARGING," which is hereby incorporated by reference in its entirety for all purposes.

BACKGROUND

Wireless power transfer, in which power is delivered via magnetic/inductive coupling between a power transmitter (PTx) and a power receiver (PRx), is useful for powering battery powered electronic devices. In some applications, wireless power transfer may be used to charge a battery in a portable electronic device, such as a mobile phone, smart watch, tablet computer, or an accessory such as a stylus, wireless earphones, etc. From a user perspective it may be desirable to charge the batteries in such devices rapidly. However, the increased currents associated with such rapid charging can introduce losses that reduce overall power consumption efficiency.

SUMMARY

Thus, it would be beneficial to provide improved power system topologies for portable electronic devices that can allow for faster battery charging with reduced losses.

A battery powered electronic device can include a wireless power system configured to receive power from a wireless power transmitter, a converter coupled to the wireless power system that converts a voltage from the wireless power system to a battery charging voltage, a battery comprising at least two cells, a power management unit that delivers power from one or more of the at least two cells to one or more subsystems of the electronic device, and a plurality of switching devices connecting the at least two cells, the converter, and the power management unit. The plurality of switching devices can be arranged so that a first switching configuration connects the cells in series for charging from the converter and a second switching configuration connects the cells in parallel for delivering power to the power management unit. The wireless power system can be further configured to deliver power from the battery powered electronic device to another device. The converter can be a bi-directional three level buck boost converter.

The plurality of switching devices can include a ladder of four switches connected between an output of the converter and ground. A first cell of the at least two cells can have a first terminal connected to a junction of an output of the converter and a first switch of the four switches and a second terminal connected to a junction between a third and fourth of the four switches. A second cell of the at least two cells can have a first terminal connected to a junction of a second switch and a third switch of the four switches and a second terminal connected to ground. The power management unit can be coupled to the junction of the second switch and the third switch.

The battery powered electronic device can further include a balancer circuit coupled to a first of the at least two cells and a second of the at least two cells that operates to equalize state of charge as between the cells. The balancer circuit can include two coupled inductors and two switches in a flyback configuration. The balancer circuit can include a charge transfer capacitor, a first switch pair arranged to permit power transfer between the first cell to the charge transfer capacitor, and a second switch pair arranged to permit power transfer between the second cell and the charge transfer capacitor.

The at least two cells can have the same capacity or different capacities. The at least two cells can have the same chemistry or different chemistries.

A battery system for a portable electronic device can include a first cell, a second cell, a first terminal that receives input power to charge the batteries, a second terminal that delivers output power from the batteries, and a plurality of switching devices arranged to allow the first and second cells to be charged in series from the first terminal when the plurality of switching devices are in a first switching state. The plurality of switching devices can be further arranged to allow the first and second cells to discharge in parallel to the second terminal when the plurality of switching devices are in a second switching state. The plurality of switching devices can be further arranged to allow the first and second cells to discharge in parallel to the first terminal when the plurality of switching devices are in the second switching state.

The battery system can further include a balancer circuit coupled to the first and second cells, wherein the balancer circuit is operable equalize state of charge as between the cells. The balancer circuit can include a first series connected inductor and switch coupled in parallel with the first cell and a second series connected inductor and switch coupled in parallel with the second cell, wherein the first and second inductors are magnetically coupled. The balancer circuit can be operable as a flyback converter to transfer charge between the first and second cells. The balancer circuit can also include a charge transfer capacitor, a first switch pair arranged to selectively couple the charge transfer capacitor to the first cell, and a second switch pair arranged to selectively couple the charge transfer capacitor to the second cell. The balancer circuit can be operable as a voltage replicator to transfer charge between the first and second cells.

The cells can have the same or different rated capacities. The cells can have the same or different chemistries.

An electronic device can include a battery comprising at least two cells, a wireless power system configured to receive power from a wireless power transmitter and to deliver power to a another device, and a bidirectional converter coupled to the wireless power system. The bidirectional converter can be configured to, in a first operating mode, receive a voltage from the wireless power system and convert it to a battery charging voltage; and, in a second operating mode, receive a battery voltage and convert it to a voltage supplied to the wireless power system. The electronic device can further include a power management unit that delivers power from at least one of the cells to one or more subsystems of the electronic device and a switching circuit having a first switching state that connects the cells in series for charging from the bidirectional converter and a second switching state that connects the cells in parallel for delivering power to the power management unit and the wireless system. The electronic device can further include a balancer circuit coupled to a first of the at least two cells and a second of the at least two cells that operates to equalize state of charge as between the cells. The balancer circuit can operate continuously. The balancer circuit can operate responsive to a state of charge imbalance between the cells reaching a threshold.

DETAILED DESCRIPTION

Figure 1:
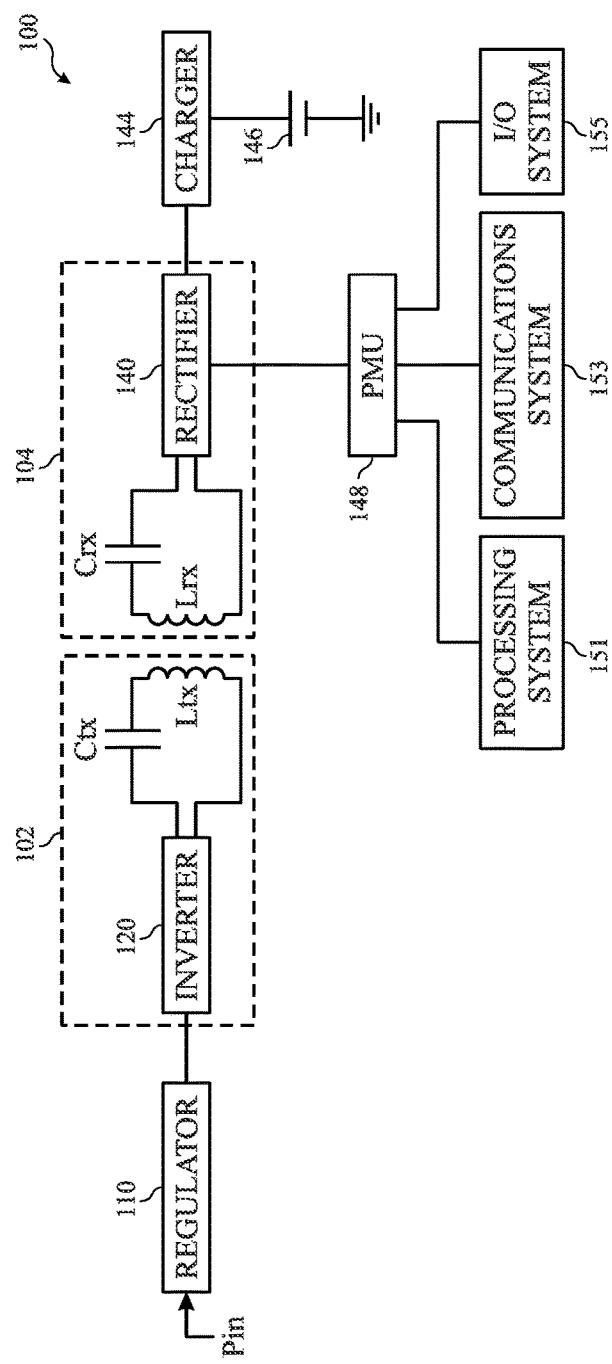
FIG. 1 illustrates an exemplary wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates an exemplary wireless power transfer system 100. The wireless power transfer system includes a power transmitter (PTx) 102 and a power receiver (PRx) 104. Power transmitter 102 may be any of a variety of devices, such as a charging mat, pad, or stand; a charging puck; or an electronic device that is capable of both receiving and delivering wireless power. Power receiver 104 can also be any of a variety of devices, including a battery-powered electronic device such as a smartphone, smart watch, tablet computer, laptop computer, a wireless accessory such as a stylus, wireless earphones, etc., or a charging case for any of the foregoing. In the illustrated embodiment, input power Pin is delivered to a regulator 110, that in turn powers power transmitter 102. In some embodiments, regulator 110 could be part of power transmitter 102. In other embodiments, it may be a separate device, such as an AC/DC adapter that plugs into a wall socket to receive mains power. In any case, regulator 110 delivers DC power to an inverter 120. Inverter 120 may be operated to generate an AC voltage that is delivered to the power transmitting coil Ltx, which magnetically couples to a power receiving coil Lrx in the wireless power receiver 104, discussed in greater detail below. The power transmitter circuit path may also include a tuning capacitor Ctx. Details of wireless power transmitter design and construction beyond the scope of this disclosure are omitted for clarity and brevity. Suffice it to say that the circuits and systems described herein may be used in conjunction with a wide variety of wireless power transmitter types.

Wireless power receiver 104 may also take a number of forms. In the illustrated example, wireless power receiver 104 is a battery powered electronic device. Wireless power receiver 104 includes a power receiving coil Lrx that may be positioned so as to be magnetically coupled to the power transmitting coil Ltx. Wireless power receiver 104 may also include a tuning capacitor Crx. The magnetic coupling between transmitter coil Ltx and receiver coil Lrx allows energy to be delivered from wireless power transmitter 102 to wireless power receiver. More specifically, a voltage may be induced at the input of rectifier 140, which may deliver a DC voltage to the various electronic systems of wireless power receiver 104 as described in greater detail below. Rectifier 140 may be a passive rectifier, for example a diode bridge, or may be an active rectifier made up of multiple switching components operated as a controlled rectifier. Further details of wireless power receiver design and construction beyond the scope of this disclosure are omitted for clarity and brevity. Suffice it to say that the circuits and systems described herein may be used in conjunction with a wide variety of wireless power receiver and electronic device types.

As mentioned above, rectifier 140 may power a power management unit (PMU) 148 that delivers power to various subsystems of a portable electronic device. One example of such subsystem is a processing system 151, which can for example include a system on a chip "SoC" or other processor/processor complex, including storage and memory systems, etc.). Another such subsystem is a communications system 153, which can include cellular, WiFi, Bluetooth, and/or other radios and appurtenances. Another subsystem could be input/output system 155, which can include displays, loudspeakers, microphones, touch or other input devices, etc. Additional or alternative electronic subsystems may be provided as appropriate for a given embodiment. Rectifier 140 may also supply power to a battery charger circuit 144, which may be used to charge a battery 146. Additionally, when other power sources, such as the wireless system or a separate wired power system are not available, the battery can supply power via PMU 148 to the various subsystems discussed above.

Figure 2:
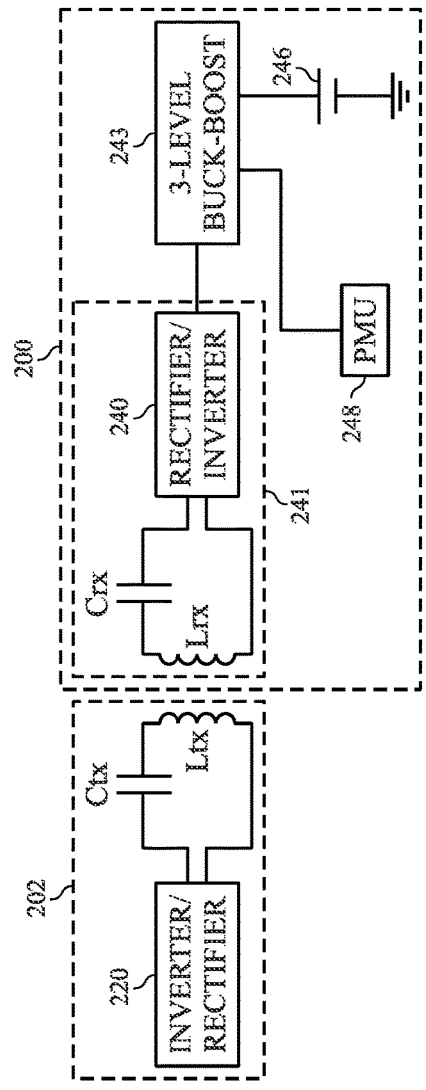
FIG. 2 illustrates another exemplary wireless power transfer system incorporating a three-level buck-boost converter to allow for bidirectional wireless power transfer.

FIG. 2 illustrates an exemplary battery powered electronic device 200 capable of bidirectional wireless power transfer.

In other words, wireless power receiver 104 can either receive power from a wireless power transmitter 202 as described above with reference to FIG. 1 or can deliver power to a wireless power receiver. To accommodate bidirectional operation, rectifier 140 may be replaced with a bidirectional rectifier/inverter 240. Thus, when a wireless power transmitter induces a voltage across receive coil Lrx, rectifier inverter may be operated as a rectifier to produce a DC output for powering the various subsystems and charging the battery as described above. Conversely if device 202 is a wireless power receiver, it may have a rectifier 220 (or an inverter/rectifier 220). Rectifier/inverter 240 of the "receiver" may be operated as an inverter to drive "receive" coil Lrx so as to transmit power to magnetically coupled inductor Ltx. Thus, in the arrangement of FIG. 2, device 202 may be a wireless power transmitter, in which case inverter/rectifier 220 operates as an inverter and rectifier/inverter 240 operates as a rectifier. Alternatively, device 202 may be a wireless power receiver, in which case inverter/rectifier 220 operates as a rectifier and rectifier inverter 240 operates as an inverter to drive receiver coil Lrx as a transmitter coil. As a result, device 202 that is coupled to device 200 may be a wireless power transmitter, a wireless power receiver, or may be capable of both modes of operation.

As a result of the above-described operating modes, the "transmitter" and "receiver" nomenclature may be slightly confusing; however, it is preserved for sake of consistency among the various embodiments. In any case, electronic device 200 may be operated in various modes. In a wireless power receive mode, it can receive power via its wireless power system 241, which power may be used to power its various subsystems via PMU 248 and to charge its battery 246. Alternatively, electronic device 200 may be operated in a battery powered mode, in which case the battery may be used to power the various subsystems via PMU 248. (The various subsystems discussed above with respect to FIG. 1 have been omitted from FIG. 2 for brevity, but it should be understood that one or more of these various systems may also be present.) Additionally, in some embodiments, electronic device 200 in its battery powered mode can supply power to another device via wireless power system 241. In some cases, electronic device 200 may also include a separate wired power system (not shown) that can be used as a separate power input, power output or both. To facilitate the bidirectional operation described above, in which device 200 can either charge its battery from wireless power system 241 (or optionally the wired power system not shown) or can use its battery 246 to power another device via wireless power system 241, a three level buck boost converter 243 is provided, operation of which is described in greater detail below with respect to FIGS. 3 and 4.

Figure 3A:
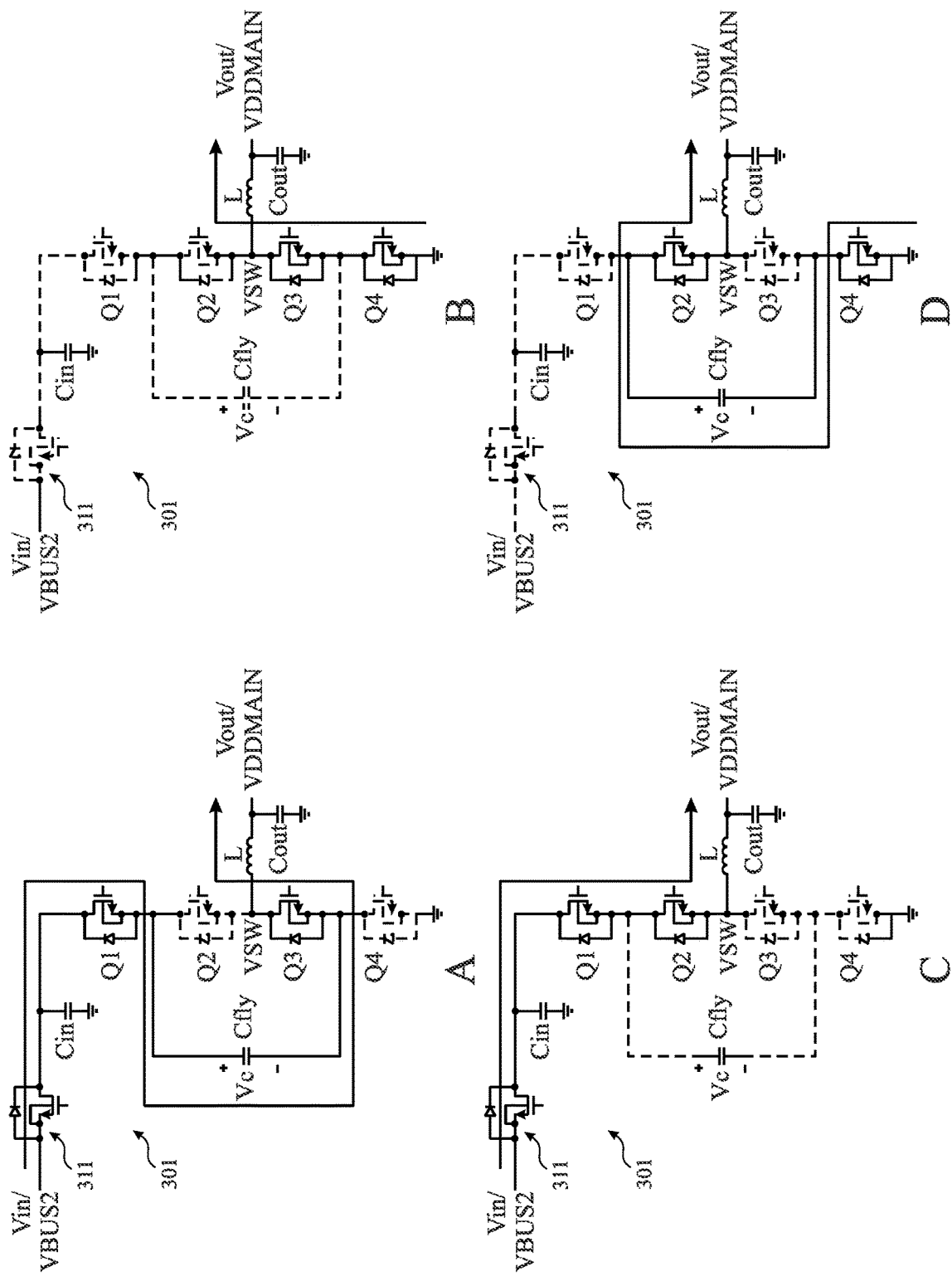
FIGS. 3A and 3B illustrates operation of a three-level buck-boost converter in a buck mode (e.g., drawing power from the wireless system).
Figure 3B:
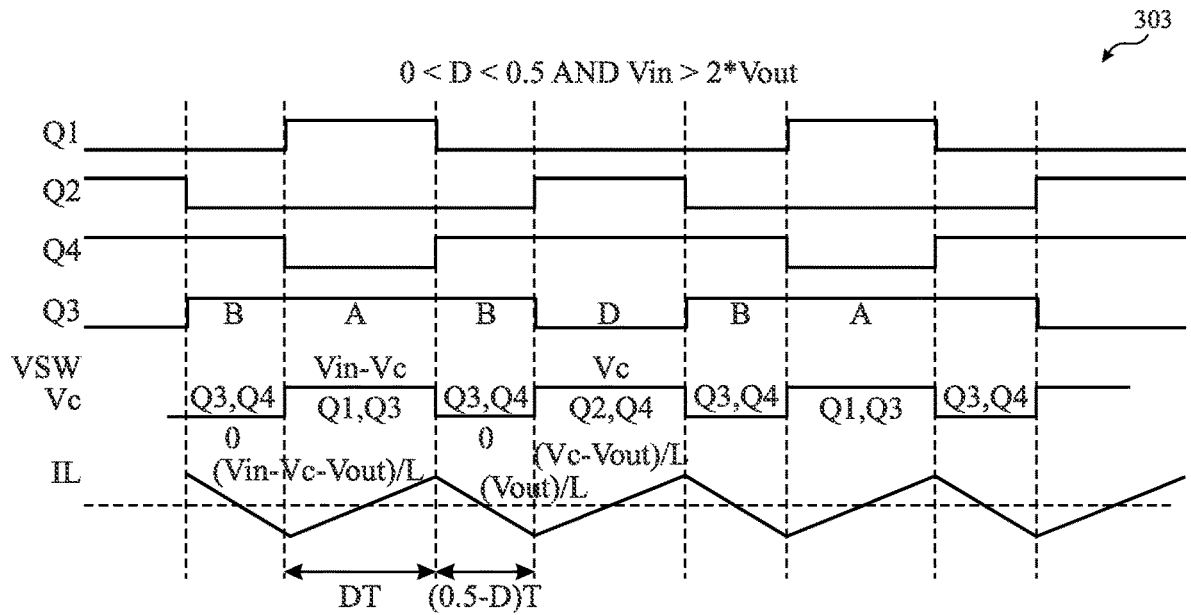
Figure 3B:
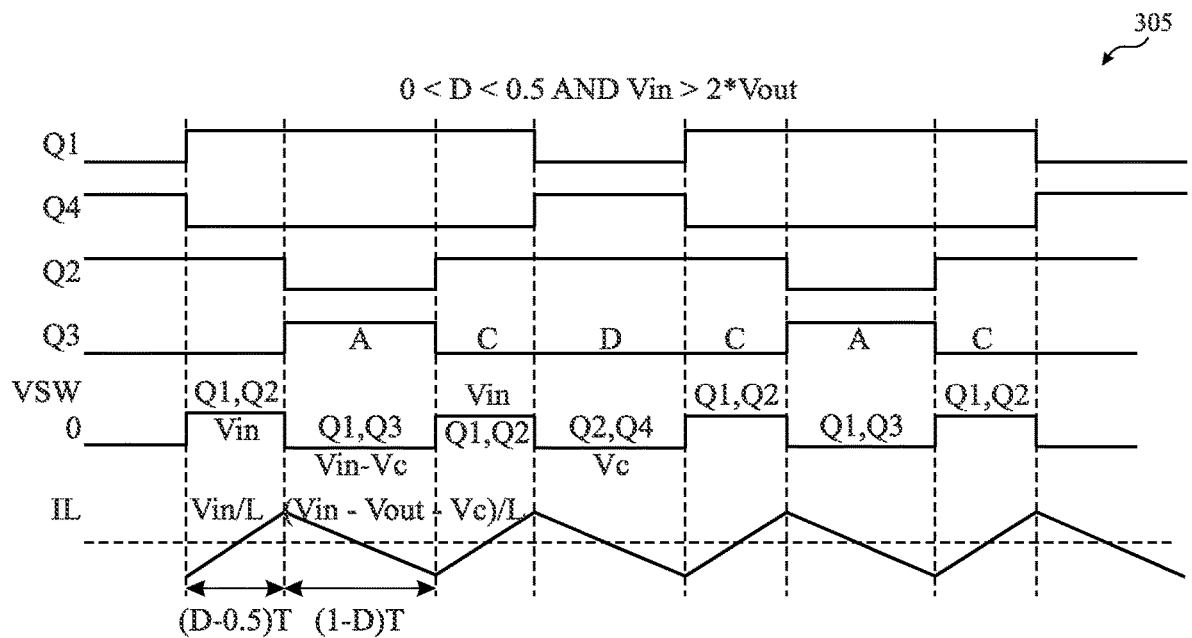

FIGS. 3A-3B illustrate operation of a three-level buck-boost converter in a buck mode (e.g., drawing power from the wireless system). More specifically, circuit block 301 illustrates a schematic of a three level buck boost converter. When operated in the buck mode, power flows from the input voltage Vin (which may be coupled to the Vbus voltage that is the output of rectifier 240) to the output voltage Vout (VDDMAIN), which may be supplied to the PMU 248 and battery 246 as illustrated in FIG. 2 above and FIGS. 5-6 below. The three level buck converter can include a disconnect switch/diode arrangement 311. This arrangement can allow power to flow from the rectifier output to the three level buck under any operating condition (via the diode). The switch may be turned on to reduce losses associated with the forward voltage drop of the diode. Likewise, power delivery (in the boost mode discussed below with respect to FIG. 4) may be enabled by turning on the switch. An input filter capacitor Cin may also be provided. In any case, the converter includes four switching devices Q1-Q4 that may be coupled between the input bus and ground in the illustrated ladder arrangement. A flying capacitor Cfly may be connected between the junction of first switch Q1 and second switch Q2 and a junction of third switch Q3 and fourth switch Q4. A buck inductor L may be coupled between the junction of second switch Q2 and third switch Q3 and the output Vout. An output filter capacitor Cout may also be provided.

Also illustrated in FIGS. 3A-3B are four switching states A-D of the three level buck boost converter that correspond to the forward/buck mode of operation. In switching state A, switches Q1 and Q3 are turned on, with switches Q2 and Q4 turned off. This results in the illustrated current path from the input, through switch Q1, through the flying capacitor, through switch Q3, through the buck inductor L, to the output. During state A, energy is stored in both flying capacitor Cfly and the inductor L. In switching state B, switches Q3 and Q4 are turned on, with switches Q1 and Q2 turned off. This prevents current flow through flying capacitor Cfly, which continues to store the energy deposited therein during a preceding switching state. During State B, energy stored in inductor L during a preceding switching state is delivered to the output. In switching state C, switches Q1 and Q2 are turned on, while switches Q3 and Q4 are turned off. As a result, in state C, current flow through flying capacitor Cfly is prevented, which allows for continued storage of energy deposited therein during a preceding switching state. However, the current path from the input to the output through inductor L causes energy to be stored in inductor L and delivered to the output. In switching state D, switches Q2 and Q4 are turned on, and switches Q1 and Q3 are turned off. As a result, energy stored in flying capacitor Cfly and inductor L is delivered to the output.

In the buck mode, differing sequences of switching states A-D may be applied to deliver a regulated output voltage Vout (VDDMAIN) from the input voltage Vin (Vbus). Block 303 illustrates a switching sequence applicable when the input voltage Vin (Vbus) is greater than twice the output voltage. This corresponds to an inductor charging duty cycle D less than 0.5. Block 303 illustrates four waveforms Q1-Q4 corresponding to the states of the switches (i.e., high corresponds to on and low corresponds to off). Thus, signals Q1-Q4 may be thought of as the gate drive signals for the switches of the three level buck converter. Block 303 also shows the voltage Vc appearing across the flying capacitor Cfly, which varies depending on the switching state. Finally block 303 also shows the current IL through buck inductor L, which ramps up and down depending on the switching state. As illustrated, the sequence of switching states is B-A-B-D, which then repeats.

Block 305 illustrates a switching sequence applicable when the input voltage Vin (Vbus) is less than twice the output voltage. This corresponds to an inductor charging duty cycle D greater than 0.5. Block 305 illustrates four waveforms Q1-Q4 corresponding to the states of the switches (i.e., high corresponds to on and low corresponds to off). Thus, signals Q1-Q4 may be thought of as the gate drive signals for the switches of the three level buck converter. Block 305 also shows the voltage Vc appearing across the flying capacitor Cfly, which varies depending on the switching state. Finally block 305 also shows the current IL through buck inductor L, which ramps up and down depending on the switching state. As illustrated, the sequence of switching states is C-A-C-D, which then repeats.

In either of the above-described cases, the voltage conversion ratio, i.e., the output voltage Vout divided by the input voltage Vin is D, which is effectively the inductor charging duty cycle. Also, in both cases, the flying capacitor Cfly voltage Vc is regulated to a value equal to ½ Vin. The voltage stress across each switching device is approximately Vin/2. Finally, the ripple frequency of the voltage/current through inductor L is twice the switching frequency.

Figure 4A:
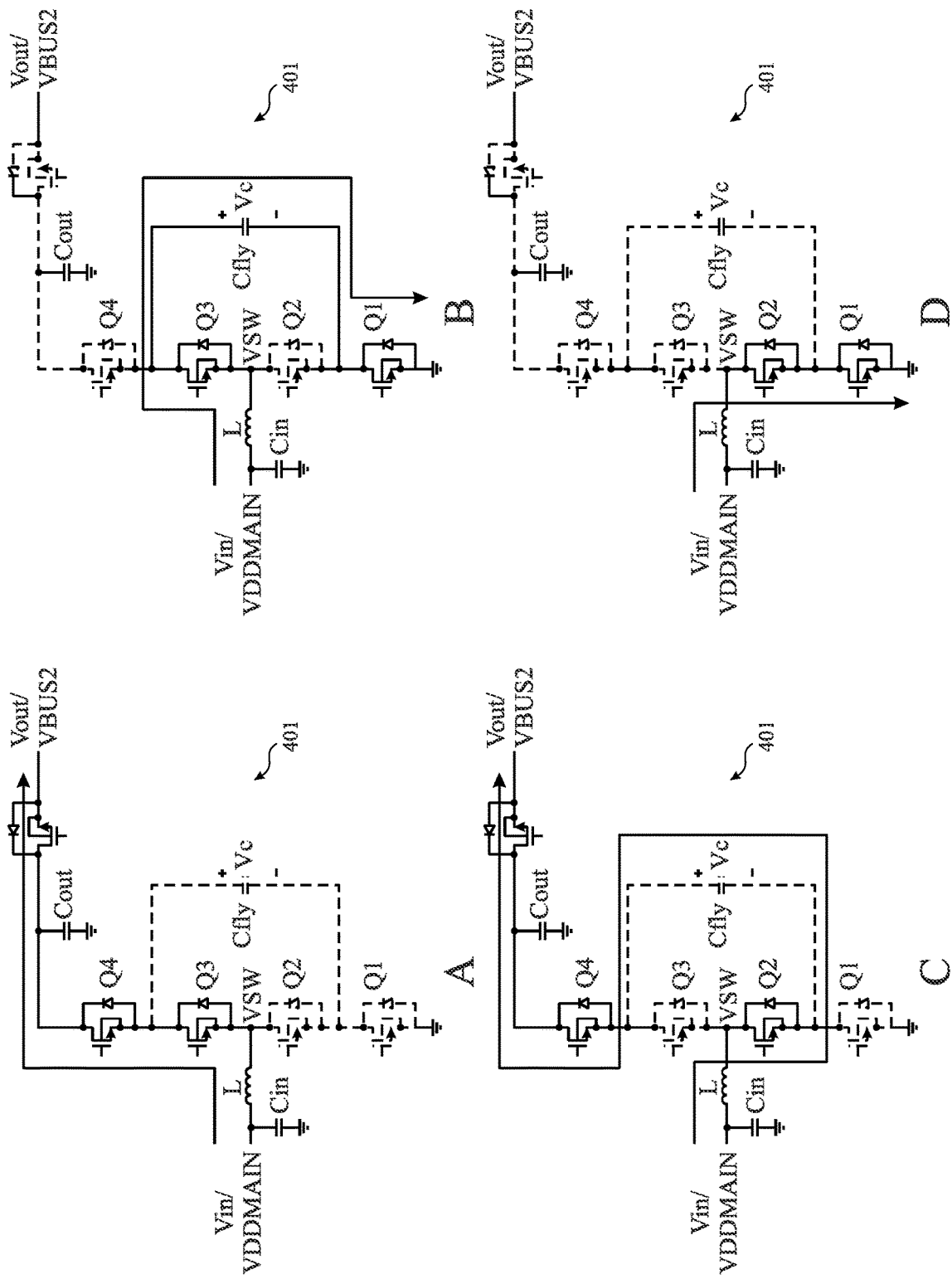
FIGS. 4A and 4B illustrates operation of a three-level buck-boost converter in a boost mode (e.g., delivering power to the wireless system).
Figure 4B:
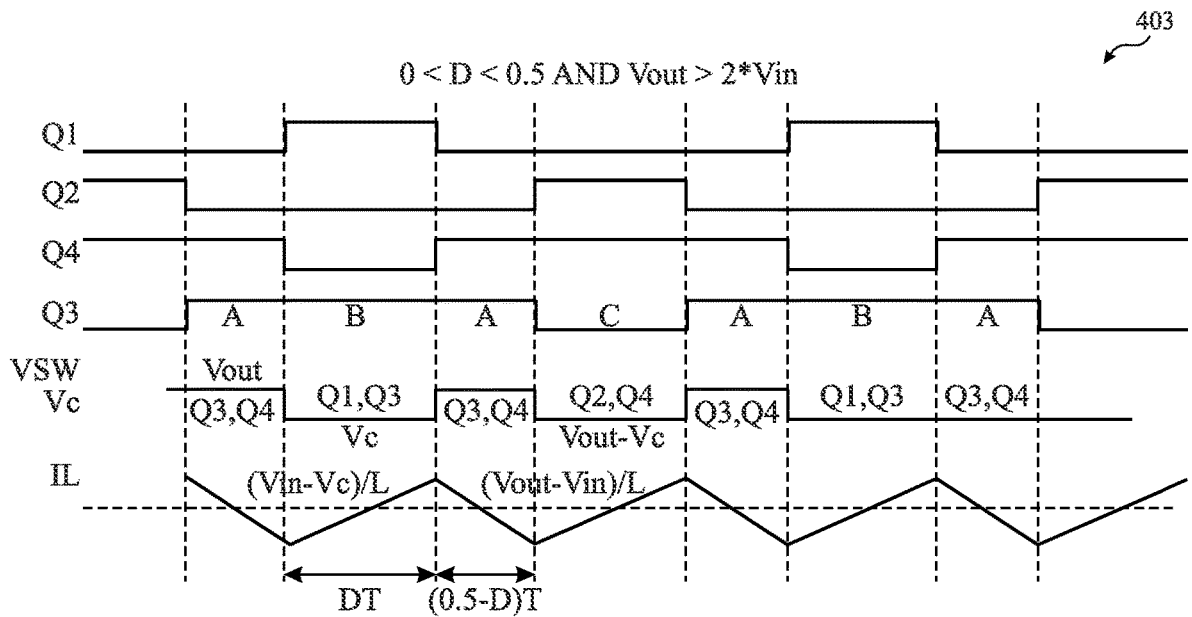
Figure 4B:
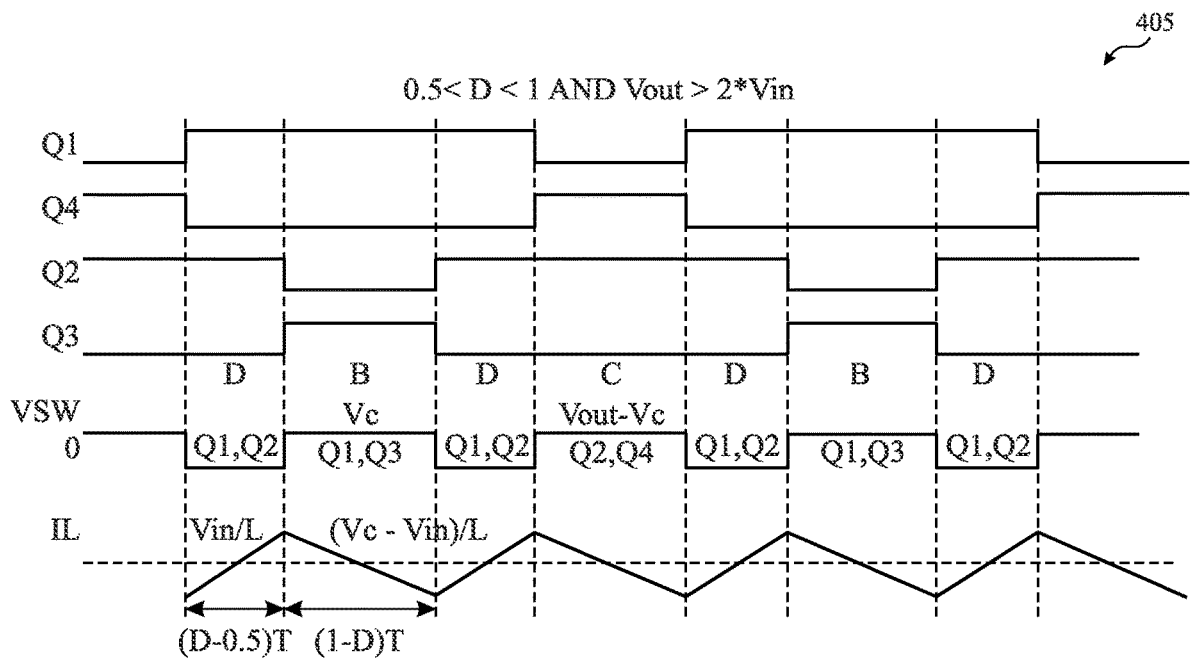

FIGS. 4A-4B illustrate operation of a three-level buck-boost converter in a boost mode (e.g., delivering power to the wireless system). More specifically, circuit block 401 illustrates a schematic of a three level buck boost converter. When operated in the boost mode, power flows from the input voltage Vin (which may be coupled to VDDMAIN, i.e., the battery bus voltage) to the output voltage Vout (Vbus), which may be supplied to rectifier/inverter 240 as illustrated in FIG. 2 above and FIGS. 5-6 below. It will be appreciated that the inputs and outputs of circuit 401 are reversed with respect to circuit 301 discussed above. Additionally, the filter capacitor designations are reversed, thus an input filter capacitor Cin may also be provided. In any case, the converter includes four switching devices Q1-Q4 that may be coupled between the input bus and ground in the illustrated ladder arrangement. The order of switches is the same as in FIG. 3, above, although the input is coupled to the junction of switches Q2 and Q3, and the output is taken from switch Q1. A flying capacitor Cfly may be connected between the junction of first switch Q1 and second switch Q2 and a junction of third switch Q3 and fourth switch Q4. Inductor L is now a boost inductor, but remains in the same position relative to the other circuit elements, being may be coupled between the junction of second switch Q2 and third switch Q3 and the input Vin. An output filter capacitor Cout may also be provided.

Also illustrated in FIGS. 4A-4B are four switching states A-D of the three level buck boost converter that correspond to the reverse/boost mode of operation. These states are labelled differently than in FIG. 3, discussed above. In switching state A, switches Q3 and Q3 are turned on, with switches Q1 and Q2 turned off. This results in the illustrated current path from the input, boost inductor L, through switches Q3 and Q4 to the output. During state A, energy is stored in the inductor L. In switching state B, switches Q1 and Q3 are turned on, with switches Q2 and Q4 turned off. This results in the illustrated current path in which current flows through boost inductor L, through switch Q3, through flying capacitor Cfly, though switch Q1 to ground. As a result, energy is stored in both boost inductor L and flying capacitor Cfly. In switching state C, switches Q2 and Q4 are turned on, while switches Q1 and Q3 are turned off. As a result, in state C, current flows through boost inductor L, switch Q2, flying capacitor Cfly, switch Q4 to the output. In state C, energy is discharged from flying capacitor Cfly. In switching state D, switches Q1 and Q2 are turned on, and switches Q3 and Q4 are turned off. As a result, energy is stored in boost inductor L, while the energy in flying capacitor Cfly remains constant.

In the boost mode, differing sequences of switching states A-D may be applied to deliver a regulated output voltage Vout (Vbus) from the input voltage Vin (VDDMAIN). Block 403 illustrates a switching sequence applicable when the output voltage Vout (Vbus) is less than twice the input voltage Vin (VDDMAIN). This corresponds to an inductor charging duty cycle D less than 0.5. Block 403 illustrates four waveforms Q1-Q4 corresponding to the states of the switches (i.e., high corresponds to on and low corresponds to off). Thus, signals Q1-Q4 may be thought of as the gate drive signals for the switches of the three level buck converter. Block 403 also shows the voltage Vc appearing across the flying capacitor Cfly, which varies depending on the switching state. Finally block 403 also shows the current IL through boost inductor L, which ramps up and down depending on the switching state. As illustrated, the sequence of switching states is A-B-A-C, which then repeats.

Block 405 illustrates a switching sequence applicable when the input voltage Vin (VDDMAIN) is less than half the output voltage Vout (Vbus). This corresponds to an inductor charging duty cycle D greater than 0.5. Block 405 illustrates four waveforms Q1-Q4 corresponding to the states of the switches (i.e., high corresponds to on and low corresponds to off). Thus, signals Q1-Q4 may be thought of as the gate drive signals for the switches of the three level buck converter. Block 405 also shows the voltage Vc appearing across the flying capacitor Cfly, which varies depending on the switching state. Finally block 405 also shows the current IL through boost inductor L, which ramps up and down depending on the switching state. As illustrated, the sequence of switching states is D-B-D-C, which then repeats.

In either of the above-described cases, the voltage conversion ratio, i.e., the output voltage Vout divided by the input voltage Vin is 1/(1-D), where D is the inductor charging duty cycle. Also, in both cases, the flying capacitor Cfly voltage Vc is regulated to a value equal to ½ Vout. The voltage stress across each switching device is approximately Vout/2. Finally, the ripple frequency of the voltage/current through inductor L is twice the switching frequency.

As noted above, in at least some applications it is desirable to charge a battery of a battery powered device relatively rapidly. This requires higher charge currents, which can result in substantially increased conduction losses (sometimes called $I^2R$ losses). For example, doubling the charging current can increase conduction losses by a factor of four. This effect can be mitigated by switching from a single cell or fixed multi-cell battery design to a 2S/2P battery design. As used herein, 2S/2P battery design refers to a configuration in which the battery includes two (or more) cells that are configured so as to charge in series and discharge in parallel. By connecting the two cells in series for charging, the voltage is effectively doubled, meaning that the same power can be delivered with half the current (reducing the conduction losses). Discharging the cells in parallel can reduce the down conversion ratio required to supply various loads, potentially allowing for reduced device voltage ratings and increased operating efficiency.

Figure 5:
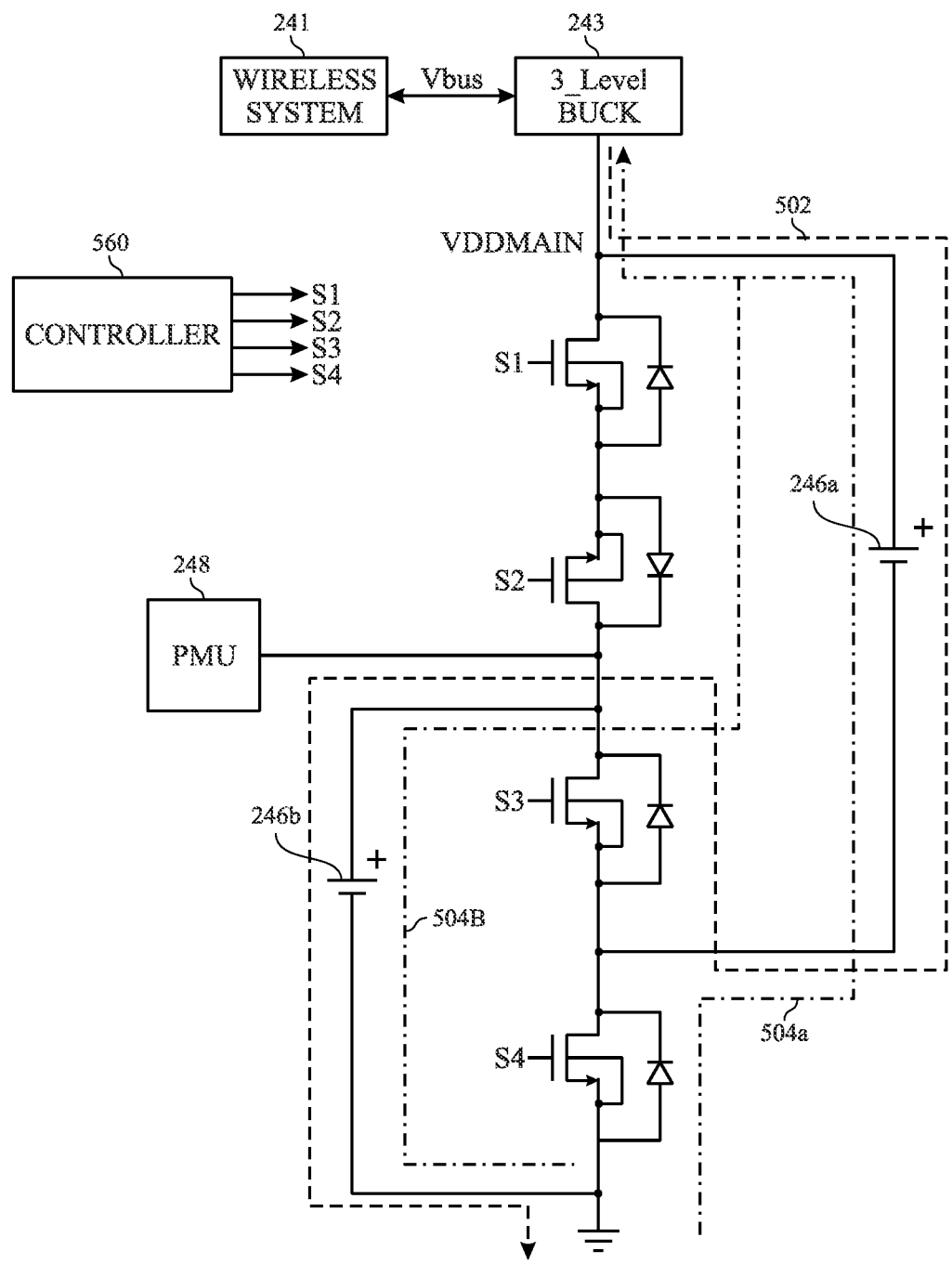
FIG. 5 illustrates a power system of a battery powered electronic device incorporating a three-level buck-boost converter and a 2S/2P battery arrangement.

FIG. 5 illustrates a simplified block diagram of a power system of a battery powered electronic device incorporating a three-level buck-boost converter (as described above) and a 2S/2P battery arrangement. The power system includes wireless system 241, which, as described above, may be either a source of power for the device or may be used to wirelessly transfer power to another device. Wireless system 241 is coupled to a three level buck boost converter 243, which may be operated as described above to either down convert (buck) power from the wireless system to the battery and PMU 248 or up convert (boost) power form the battery to wireless system 241. The battery arrangement in this case includes two cells 246a and 246b, which may be charged in series (2S) and discharged in parallel (2P) via operation of switches S1-S4 as described in greater detail below.

Facilitating the 2S/2P operation is a ladder of switching devices S1-S4 coupled between three level buck converter 243 and ground. These switches may be turned on or off by controller 560 (which can be configured to generate suitable drive signals for switches S1-S4) to connect cells 246a and 246b in series or parallel depending on the mode of operation. More specifically, to facilitate series charging of cells 246a and 246b, switches S1, S2, and S4 may be turned off, while switch S3 is turned on. This results in current path 502, which charges cells 246a and 246b in series via three level buck boost converter 243. Also, in the charging mode, PMU 248 receives power via cell 246b. Viewed another way, a portion of the charging current that charges cell 246a is diverted to PMU 248 before reaching cell 246b. Subsystems 151, 153, and 155 are omitted from FIG. 5 for brevity, but it is understood that one or more such subsystems powered by PMU 248 may be present. In any case, because the presence of PMU 248 prevents cells 246a and 246b from being strictly in series, i.e., experiencing identical current, the difference between the charging current provided to cell 246a and to cell 246b (i.e., the charging current of cell 246a less the current to PMU 248) can result in an imbalance between cells 246a and 246b that may be addressed as described in greater detail below.

To facilitate parallel discharge of cells 246a and 246b, switches S1, S2, and S4 may be turned on, while switch S3 is turned off (i.e., the complement or inverse of the switching state that permits 2S charging). This allows cell 246a to discharge via path 504a. In other words, switch S4 being on allows current flow from cell 246a to three level buck boost converter 243 to power the wireless system to provide power to another wireless power transfer enabled device. Likewise, cell 246a can supply power to PMU 248 via switches S4, S1, and S2. Similarly, cell 246b can supply power to three level buck boost converter 243 via turned on switches S1 and S2 via path 504b. Finally, PMU 248 may also draw power from cell 246b via its direct connection. To summarize, all loads, i.e., wireless system 241 via three level buck boost converter 243 and PMU 248 can both draw power from cells 246a and 246b in parallel. However, it will be appreciated that the cells are not strictly connected in parallel. For example, cell 246a can power three level buck boost converter 243 through a single switch S4, while cell 246b can power three level buck boost converter 243 through two switches, S1 and S2. Thus, there will be a slight difference in impedance as between the two current paths (including additional differences that may be introduced by different conductor lengths). Similarly, cell 246b can power PMU 248 with no intervening switches, while cell 246a can power PMU only through a current path that includes three switches S1, S2, and S4. Thus, like in the charging case, an imbalance as between the cells can occur, although the imbalance introduced during discharge may be substantially smaller because it is caused by relatively small differences in current path impedance (including the relatively small ON-resistance of the various switching devices), while the discharging imbalance is occasioned by the relatively larger power draw of the PMU 248 and subsystems powered thereby.

Figure 6:
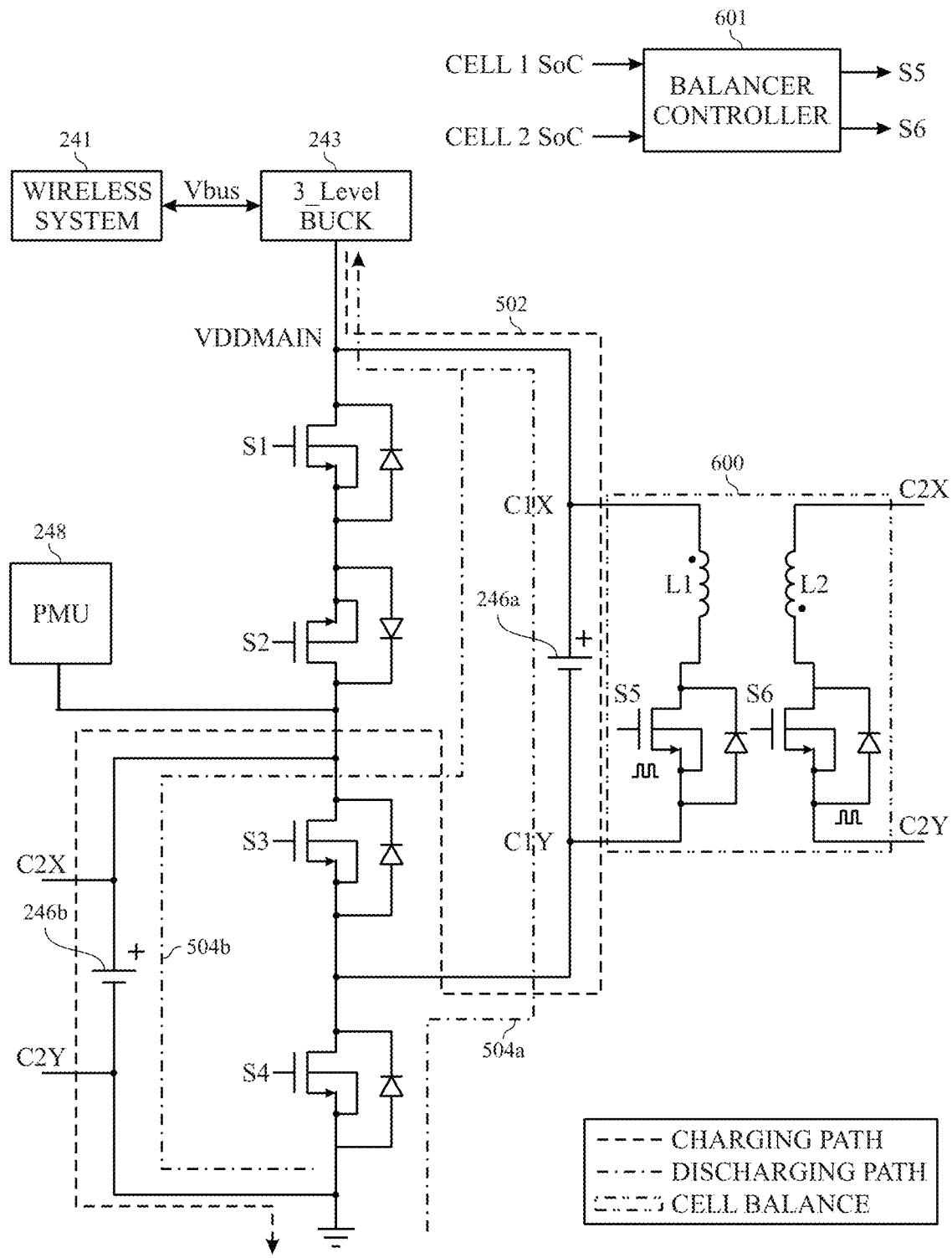
FIG. 6 illustrates a power system of a battery powered electronic device incorporating a 2S/2P battery arrangement and a flyback-based cell balancer.

FIG. 6 illustrates a power system of a battery powered electronic device incorporating a 2S/2P battery arrangement and a flyback-based cell balancer 600. Flyback balancer 600 can be coupled across cell 246a at terminals C1X and C1Y and across cell 246b at terminals C2X and C2Y. Flyback cell balancer 600 can include coupled inductors L1 and L2 connected with the asymmetric polarity shown, together with corresponding switching devices S5 and S6. Switches S5 and S6 may be turned off entirely, disabling flyback cell balancer 600. In operation, switches S5 and S6 may be operated complementarily, that is, when S5 is turned on, S6 is turned off and vice-versa. The switches may be driven with a pulse width modulated (PWM) signal responsive to the difference in state of charge as between cells 246a and 246b. For identical cells, cell voltage may serve as a proxy for state of charge. For cells having different capacities and/or different chemistries, battery monitoring systems may be used to provide the respective cells' states of charge to the balancer controller 601. Responsive to the degree of imbalance between the cells, balancer controller 601 can generate drive signals for switches S5 and S6 to facilitate charge transfer from the more charged cell to the less charged cell.

More specifically, assume that the system illustrated in FIG. 6 is operating in a mode in which cells 246a and 246b are being charged from wireless system 241. As discussed above, switch S3 is closed, and switches S1, S2, and S4 are open. Charging current flows along illustrated path 502 through cells 246a and 246b. However, the current through the respective cells is not identical because a certain amount of current is delivered to PMU 248 to power other systems of the electronic device. Thus, cell 246a will charge at a faster rate than cell 246b. When this difference in state of charge (SoC) is detected, balancer controller 601 can generate PWM drive signals for switch S5 and complementary drive signals for switch S6 to transfer charge from cell 246a to 246b. When switch S5 is turned on, cell 246a will cause a linearly increasing current to flow in inductor L1, storing energy therein. When switch S5 is turned off and switch S6 is turned on, the energy stored in the previous half switching cycle will be delivered from inductor L2 via switch S6 to cell 246b. Thus, balancer 600 can operate as a flyback converter to deliver energy from cell 246a to 246b, with switch S5 acting as the main switch and switch S6 acting as a synchronous rectifier switch. The reverse operation is also possible, namely to transfer energy from cell 246b to cell 246a, switch S6 may be driven as the main switch, storing energy from cell 246b in the coupled inductor arrangement, and switch S5 may be operated as a synchronous rectifier switch, delivering the stored energy to cell 246a.

Figure 7:
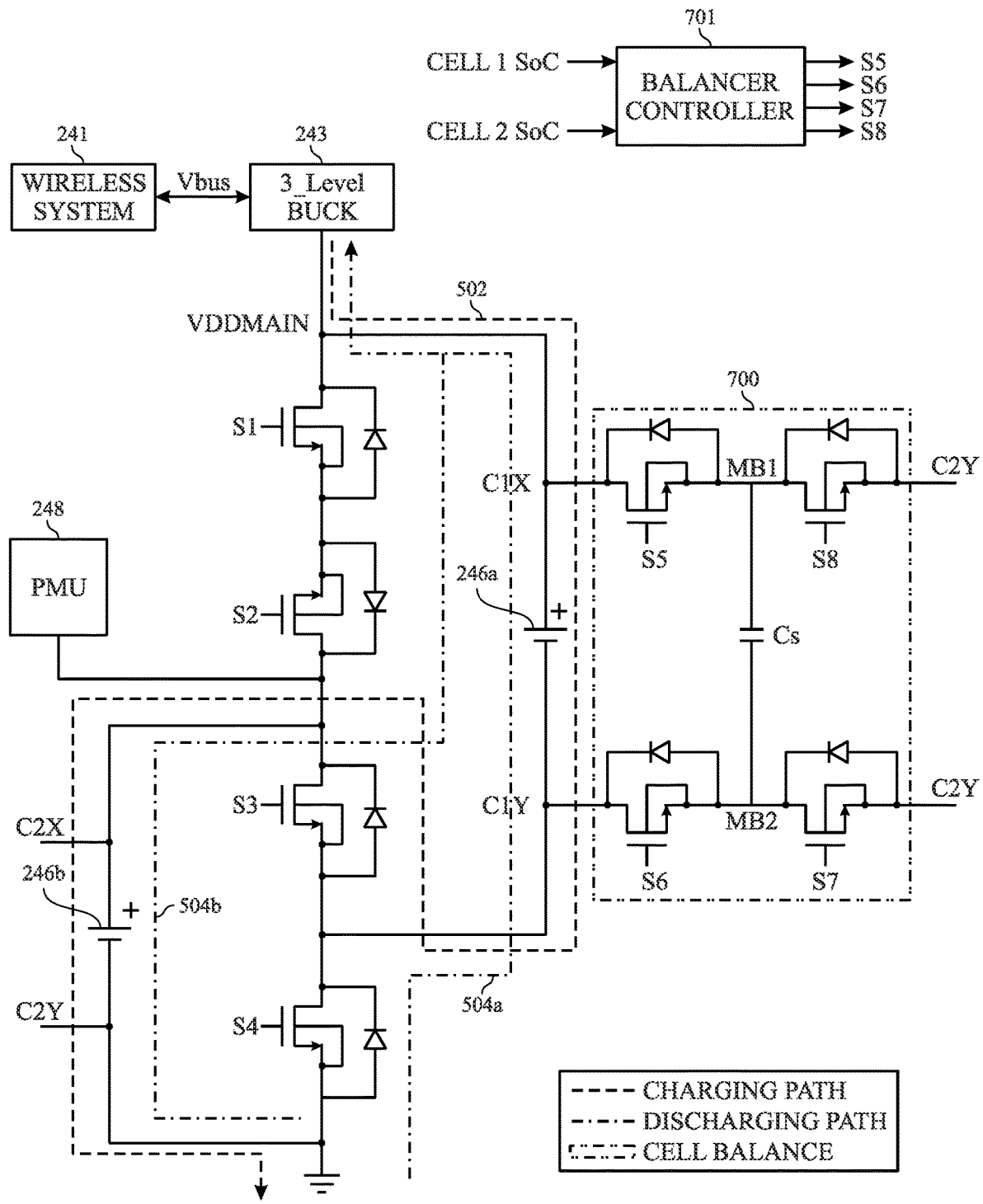
FIG. 7 illustrates a power system of a battery powered electronic device incorporating a 2S/2P battery arrangement and a switched capacitor voltage replicator-based cell. balancer.

FIG. 7 illustrates a power system of a battery powered electronic device incorporating a 2S/2P battery arrangement and a switched capacitor voltage replicator based cell balancer 700. Balancer 700 may operate substantially similarly to flyback balancer 600 discussed above with reference to FIG. 6. Namely, balancer 700 may be operated by a balancer controller 701 to equalize charge between cell 246a and 246b. Rather than a flyback topology, balancer 700 includes a switched capacitor arrangement including a capacitor Cs and two switch pairs S5/S6 and S7/S8 respectively coupling the capacitor to either cell 246a or 246b. To transfer energy from cell 246a to 246b, switches S5 and S6 may be closed while switches S7 and S8 are open. This will charge capacitor Cs. Then, switch pair S5/S6 may be opened and switch pair S7/S8 closed, connecting capacitor Cs to cell 246b and allowing the energy stored in capacitor Cs to be transferred to cell 246b.

In the examples of FIGS. 6 and 7, the cell balancing circuits may operate continuously, so as to maintain charge equilibrium as between the cells. Alternatively, the cell balancing circuits may be triggered once a first threshold imbalance level is reached and operated until the cells are balanced within a second threshold imbalance level (essentially operating as a sort of hysteretic controller). In some applications the charge balancer circuitry may be configured to operate continuously during charging operations and responsive to imbalance thresholds during discharging.

The foregoing describes exemplary embodiments of battery-powered portable electronic devices that include wireless power transfer capabilities. Such systems may be used in a variety of applications but may be particularly advantageous when used in conjunction with wireless power transfer systems battery-powered electronic devices such as a mobile phones, smart watches, and/or tablet computers including accessories for such devices such as wireless earphones, styluses, and the like. However, any battery-powered system for which increased overall efficiency is desired may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A battery powered electronic device comprising:
a wireless power system configured to receive power from a wireless power transmitter;
a converter coupled to the wireless power system that converts a voltage from the wireless power system to a battery charging voltage;
a battery comprising at least two cells;
a power management unit that delivers power from one or more of the at least two cells to one or more subsystems of the battery powered electronic device; and
a plurality of switching devices connecting the at least two cells, the converter, and the power management unit, wherein the plurality of switching devices are arranged so that a first switching configuration connects the cells in series for charging from the converter and a second switching configuration connects the cells in parallel for delivering power to the power management unit.

2. The battery powered electronic device of claim 1 wherein the wireless power system is further configured to deliver power from the battery powered electronic device to another device.

3. The battery powered electronic device of claim 2 wherein the converter is a bi-directional three level buck boost converter.

4. The battery powered electronic device of claim 1 wherein:
the plurality of switching devices comprises a ladder of four switches connected between an output of the converter and ground;
a first cell of the at least two cells has a first terminal connected to a junction of an output of the converter and a first switch of the four switches and a second terminal connected to a junction between a third and fourth of the four switches; and
a second cell of the at least two cells has a first terminal connected to a junction of a second switch and a third switch of the four switches and a second terminal connected to ground.

5. The battery powered electronic device of claim 4 wherein the power management unit is coupled to the junction of the second switch and the third switch.

6. The battery powered electronic device of claim 1 further comprising a balancer circuit coupled to a first of the at least two cells and a second of the at least two cells that operates to equalize state of charge as between the cells.

7. The battery powered electronic device of claim 6 wherein the balancer circuit comprises two coupled inductors and two switches in a flyback configuration.

8. The battery powered electronic device of claim 6 wherein the balancer circuit comprises:
a charge transfer capacitor;
a first switch pair arranged to permit power transfer between the first cell to the charge transfer capacitor; and
a second switch pair arranged to permit power transfer between the second cell and the charge transfer capacitor.

9. The battery powered electronic device of claim 1 wherein the at least two cells have the same capacity.

10. The battery powered electronic device of claim 1 wherein the at least two cells have the same chemistry.

11. An electronic device comprising:
a battery comprising at least two cells;
a wireless power system configured to receive power from a wireless power transmitter and to deliver power to another device;
a bidirectional converter coupled to the wireless power system, the bidirectional converter being configured to:
in a first operating mode, receive a voltage from the wireless power system and convert it to a battery charging voltage; and
in a second operating mode, receive a battery voltage and convert it to a voltage supplied to the wireless power system;
a power management unit that delivers power from at least one of the cells to one or more subsystems of the electronic device; and
a switching circuit having a first switching state that connects the cells in series for charging from the bidirectional converter and a second switching state that connects the cells in parallel for delivering power to the power management unit and the wireless power system.

12. The electronic device of claim 11 further comprising a balancer circuit coupled to a first of the at least two cells and a second of the at least two cells that operates to equalize state of charge as between the cells.

13. The electronic device of claim 12 wherein the balancer circuit operates continuously.

14. The electronic device of claim 12 wherein the balancer circuit operates responsive to a state of charge imbalance between the cells reaching a threshold.

* * * * *